UNITED STATES PATENT OFFICE.

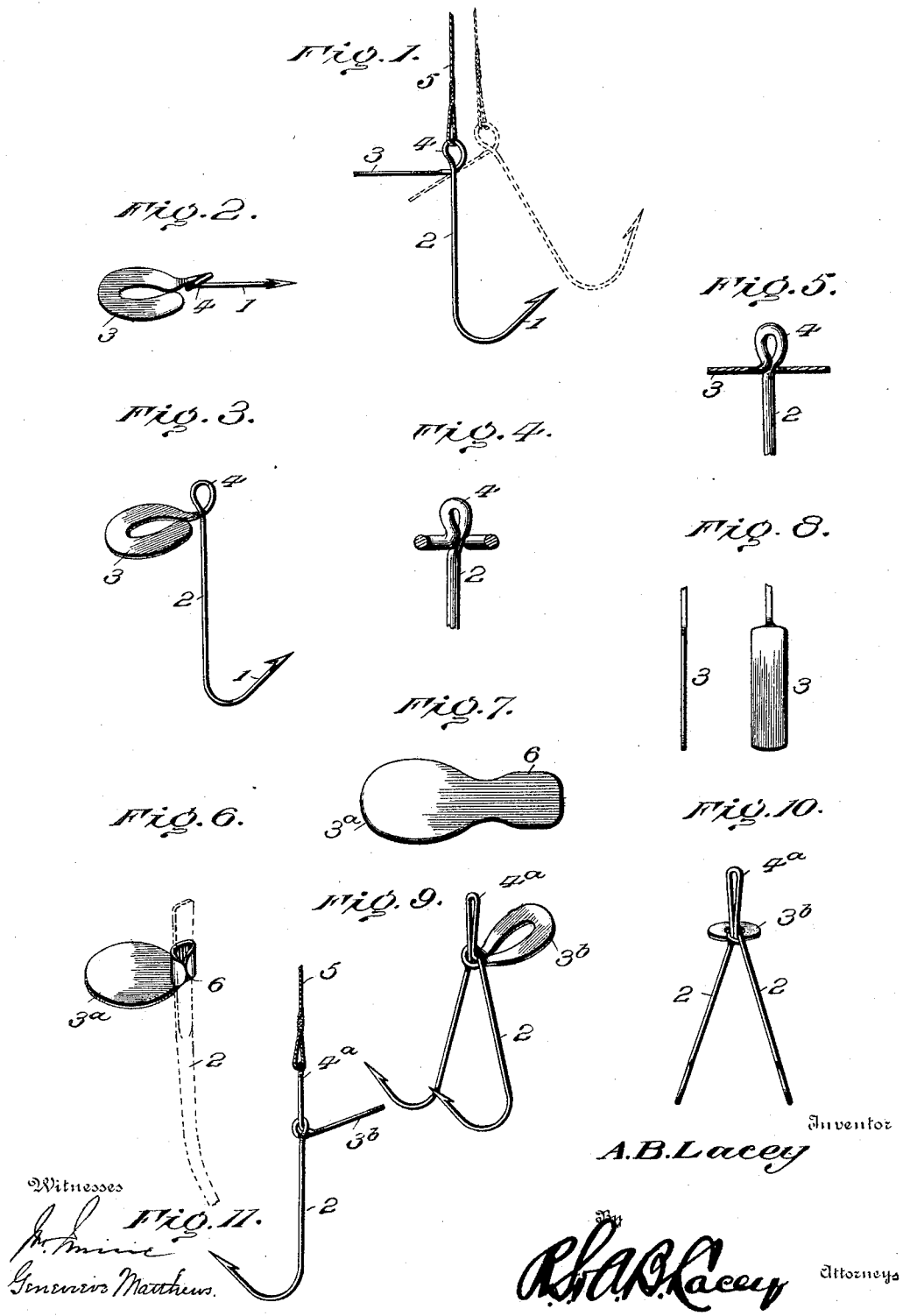

ANDERSON B. LACEY, OF WASHINGTON, DISTRICT OF COLUMBIA.

FISH-HOOK.

SPECIFICATION forming part of Letters Patent No. 699,397, dated May 6, 1902.

Application filed September 5, 1901. Serial No. 74,399. (No model.)

*To all whom it may concern:*

Be it known that I, ANDERSON B. LACEY, a citizen of the United States, residing at Washington, in the District of Columbia, have invented certain new and useful Improvements in Fish-Hooks; and I do hereby declare the following to be a full, clear, and exact description of the invention, such as will enable others skilled in the art to which it appertains to make and use the same.

This invention provides a fish-hook which will maintain an approximately vertical position in the water and spring forward when the line is given a quick pull or jerk. The desirability of a hook possessing these characteristics has long been felt by anglers, since it insures the snaring of many fish which would otherwise be lost. The invention also prevents swallowing the hook and assists in attracting the fish's attention.

The invention consists, essentially, of a vane or wing extended from the shank of a fish-hook in a diametrically opposite direction to the crook and located some distance therefrom. This rear extension is, in effect, a hydroplane, against which the water exerts a resistance when the line is quickly drawn upon, with the result that the hook shoots forward and catches any fish close to and in advance of the hook. Within the purview of the invention this vane or hydroplane may be variously formed and combined with the hook, depending largely upon the caprice of the manufacturer, the demands of the trade, the style and size of the hook, and the nature of the fishing.

The invention is summarized in the claims, and the best form of manufacture now known to me is constructed substantially as shown in the drawings and hereinafter described in detail.

In the drawings, Figure 1 is a side view of a fish-hook embodying the invention, the full lines indicating the normal position and the dotted lines showing the position assumed by the hook when the line is given a smart pull or jerk. Fig. 2 is a top plan view of the hook. Fig. 3 is a perspective view. Fig. 4 is a rear view of the upper part of the shank, the rear extension being in section and showing its outline prior to being flattened. Fig. 5 is a view similar to Fig. 4, showing the rear extension as it appears when flattened to form the vane or hydroplane. Fig. 6 is a perspective view of a modification. Fig. 7 is a detail view of the blank of the form of hydroplane applied in Fig. 6. Fig. 8 is an edge and plan view of a different form of vane. Fig. 9 is a perspective view of a further modification. Figs. 10 and 11 are front and side views thereof, respectively.

Corresponding and like parts are referred to in the following description and indicated in all the views of the drawings by the same reference characters.

The invention is designed for application to any form, make, size, or style of hook used in fishing, and the vane or hydroplane may be an integral part of the hook or separate from and attached thereto in any way found most advantageous and desirable. In order to secure the best results, the point 1 of the hook should extend outward about as shown in Figs. 1 and 3 to snare the fish when the hook is impelled forward by the combined action of the vane and resistance of the water. The degree of inclination of the point 1 with reference to the shank 2 is unimportant and will best be determined by conditions confronting the angler. The vane or wing 3 projects rearwardly from the shank 2 and is arranged some distance from the point 1 and preferably adjacent the eye 4 or point of attachment of the line 5 with the hook. In the preferable construction the vane is an integral part of the hook and is formed by extending an end portion of the wire in the rear of the shank 2 and flattening the rearwardly-projecting part, so as to present sufficient resistance-surface for the water to act against to compel the hook to jump forward when the line 5 is quickly drawn upon or jerked. As shown in Fig. 8 the rearwardly-extending part 3 is straight, whereas in the form shown in Figs. 2, 3, 4, and 5 the rearwardly-extended part is folded or looped, the members or parts of the loop being flattened. The vane projects from the shank 2 in a diametrically opposite direction to the point or crook 1, and when the line 5 is given a smart pull the hook jumps forward about as shown by the dotted lines in Fig. 1, this being due to the resistance of the water to the upward movement of the vane 3, which latter assumes an inclined position and acts as a hydroplane to forcibly impel the hook forward. The angular position of the vane with reference to the shank 2 may be varied to secure the best results, according to the special use for which the hook embodying the invention is designed.

The vane may be separate from the hook and attached thereto in any selected way, and this form of the invention is illustrated in Fig. 6, which shows the vane 3ª attached to the shank of the hook by having parts 6 bent about said shank. In this construction the vane may be stamped from sheet metal or other stiff material and may be attached to the hook as desired. As indicated in Fig. 7, the blank is oblong and is contracted at a point between its ends corresponding to the bend in order to throw the vane 3ª about at a right angle to the shank of the hook when attached thereto.

The vane may be highly polished or given any configuration to make it attractive, and the lower side may be of such finish as to reflect or magnify the bait, thereby adding to the enticing qualities of the hook. The vane also acts as a guard and prevents the hook from being swallowed and will steady the hook and enable the variety of fish having a small mouth to readily take the bait and hook, which would otherwise be difficult if the part 3 were dispensed with. In a stream or current the hook will maintain an approximately vertical position by reason of the vane remaining parallel with the current.

It is contemplated to apply the invention to a plurality of hooks—such, for instance, as shown in Figs. 9, 10, and 11, which illustrate two hooks formed at the ends of a single wire, the intermediate portion of the wire forming the eye 4ª and the vane 3ᵇ. The position of the vane in the length of the hook is unimportant so long as the desired result is effected. When the invention is applied to a plurality of hooks, they start forward under the action of the vane when the line is jerked.

Having thus described the invention, what is claimed as new is—

1. A fish-hook provided with an offstanding vane or wing to serve as a hydroplane and impart a forward movement to the hook when the line receives a smart pull or jerk, substantially as set forth.

2. A fish-hook having a vane or wing extended rearwardly therefrom in a diametrically opposite direction to the point to provide a hydroplane to cause the hook to spring forward simultaneously with a quick pull or jerk upon the line, substantially as specified.

3. A fish-hook having a rearwardly-extended vane of greater transverse extent than the body of the hook and rigid therewith and adapted to receive the resisting influence when the line is quickly drawn upon to impel the hook forward, substantially as set forth.

4. A fish-hook having an end portion of the wire from which it is formed rearwardly bent and transversely flattened to provide a vane or hydroplane for the resisting action of the water to cause a forward spring of the hook when the line is quickly drawn upon or jerked, substantially as set forth.

5. A fish-hook having an end portion bent to provide an eye and rear extension, which latter is transversely flattened to form a vane or hydroplane, substantially as and for the purpose set forth.

6. A fish-hook having an end portion rearwardly bent and rebent and flattened to form a vane or hydroplane, substantially as and for the purpose set forth.

In testimony whereof I affix my signature in presence of two witnesses.

ANDERSON B. LACEY. [L. S.]

Witnesses:
GENEVIEVE MATTHEWS,
HARRY C. ROBB.